Patented July 7, 1931

1,813,377

UNITED STATES PATENT OFFICE

HARRY P. BANKS, OF SEATTLE, WASHINGTON

PROCESS OF MAKING A WATER RESISTANT ADHESIVE AND TO THE PRODUCT THEREOF

No Drawing.  Application filed January 26, 1929. Serial No. 335,397.

My invention relates to the process of making a water resistant adhesive and the product thereof. More particularly, my invention relates to the addition of a chemical compound, namely furfural, to an adhesive, the base of which adhesive is an oleaginous seed flour which chemical compound has the effect of increasing the dry strength of the resultant adhesive. Moreover, my invention relates to the increasing of the water resistance of said adhesive by the addition of said furfural.

By oleaginous seeds I mean such oil bearing seeds as soya beans, peanuts, cottonseed, linseed, sesame seed, castor beans, sunflower seed, etc.

By oleaginous seed flours I mean the products obtained by fine grinding of the residues remaining in the form of cake or meal after removal of the natural oil content of oleaginous seeds in whole or in part, such removal being accomplished by pressure or extraction with solvents or a combination of both methods. And also I include in the term oleaginous seed flour the flour obtained by fine grinding the material of high protein content obtained by extraction of such oleaginous seed residues.

Wherever the term "casein" is used herein, it is used to include protein of milk whether such protein is in the form of wet curd or dried and ground, and also whether sulphuric acid or hydrochloric acid precipitated or natural sour casein.

By the term "dispersed condition", as applied to oleaginous seed flours and to casein, I mean the state attained in the transformation of a mealy or granular mass to a more or less smooth mass in the presence of a liquid, and to such extent as I thus refer to the degree of subdivision of particles I believe that I am using the term "dispersion" not inconsistently with the accepted usage of colloid chemists.

I have discovered that when furfural is used in the manufacture or compounding of adhesives embodying oleaginous seed flours in dispersed condition the strength and water resistance of the resultant adhesives are greatly increased over the strength and water resistance of the same adhesives manufactured without the addition of furfural. I have also discovered the same fact relative to adhesives embodying a mixture of oleaginous seed flours and casein.

For example, by way of comparison, in the manufacture of adhesives for plywood I may illustrate with formulæ embodying soya bean flour.

(A) In a suitable mixing device place 500 parts of water. Stir in a dry mixture composed of 180 parts soya bean flour, 28 parts calcium hydrate, 28 parts powdered rosin, 40 parts magnesium oxide. Add 30 parts of 18% caustic soda solution and stir well. Add 220 parts of water with 90 parts of a solution containing approximately 34% dry sodium silicate. Stir 15 minutes and add 230 parts of water and stir until smooth. Adhesive (A) is now ready to be spread on plywood.

(B) Proceed exactly as in (A) except that 10 parts of technical grade furfural are added with the final addition of water.

Adhesives (A) and (B) were used to make up 3-ply fir panels. These panels were stored five days and test pieces cut from them to determine dry tensile strength in standard plywood testing machine. Also test pieces were placed to soak in water for 48 hours and then tested on the same machine. Following are results in pounds per square inch:

|   | Dry | After soaking 48 hours |
|---|---|---|
|   | Pounds | Pounds |
| A | 175 | 50 |
| B | 250 | 160 |

The marked increase in adhesive strength and water resistance of adhesive (B) over adhesive (A) is readily apparent.

Marked benefits were noted in similar formulæ when the furfural was added at other stages of the compounding of the adhesive, as for instance the furfural may be mixed with the dry ingredients at time of adding same to the initial water in the mixing device. Furthermore, beneficial results were noted when oleaginous seed flour adhesives embodying furfural were used on other woods such as pine, birch and gum.

I have used an adhesive embodying the following ingredients in the proportions noted.

|  |  | Parts |
|---|---|---|
| (C) | Soya bean flour | 180 |
|  | Casein | 50 |
|  | Calcium hydrate | 70 |
|  | Powdered rosin | 28 |
|  | 18% caustic soda solution | 30 |
|  | 34% sodium silicate solution | 90 |
|  | Furfural | 15 |
|  | Water | 970 |

This adhesive (C) gave results of 225 lbs. per square inch dry strength, 120 lbs. per square inch strength after soaking for 48 hours, as compared with results of adhesive (A) above.

In further illustration of the marked effect of the use of furfural in adhesives embodying oleaginous seed flour I may give the following formula with results obtained with and without the use of furfural when the adhesive was applied to both fir and birch plywood.

I do not restrict myself to the ingredients or percentages of ingredients given in the formulæ herein set forth, and particularly not to the kind of oleaginous seed flour nor to the percentage of same, since these formulæ are merely examples of a large number which I have used successfully and they are given herein for the purpose of illustration only.

| Soya bean flour | 72.5% |
|---|---|
| Calcium hydrate | 12.3% |
| Rosin (powdered) | 3.9% |
| Potassium permanganate | 0.3% |
| Sodium fluoride | 11.0% |

These ingredients are thoroughly mixed in the dry state in the following manner: 1000 parts of soya bean flour, 150 parts of calcium hydrate, 225 parts of rosin, 20 parts of potassium permanganate, are mixed together dry, sacked off and allowed to stand for aging purposes for a period of thirty days or longer. Then, 351½ parts of this preliminary dry mix, 800 parts of soya bean flour, 140½ parts of calcium hydrate, 158 parts of sodium fluoride are mixed together dry and sacked off and this mixture comprises the percentage formula given above.

Then 250 lbs. of water are placed in a mechanical mixer of suitable type. One hundred pounds (100 lbs.) of the above described mixture of dry ingredients are added to the water and the whole stirred well. Then 75 lbs. of water are added and the whole stirred until smooth and free from lumps.

The adhesive is now ready for use on the material to be glued, such for instance as plywood, and may be designated as adhesive (D).

Adhesive (E) is prepared exactly in the same manner as adhesive (D) except that five parts of furfural are added with the final water.

Fir and birch veneer was laid up with adhesives (D) and (E) and tested dry and also after soaking test pieces for 48 hours in the same manner as hereinbefore described. The results of such tests of strength of the adhesives are given below in pounds per square inch.

|  | Dry tests | | Tests after soaking 48 hours | |
|---|---|---|---|---|
|  | Fir veneer | Birch veneer | Fir veneer | Birch veneer |
|  | Pounds | Pounds | Pounds | Pounds |
| Adhesive (D) | 195 | 220 | 100 | 90 |
| Adhesive (E) | 250 | 270 | 200 | 120 |

It will be observed that the addition of the furfural has very markedly increased the strength and water resistance of the adhesive.

As a further example of the benefit to be derived by the use of furfural in oleaginous seed flour adhesives I give the following:

|  | Parts |
|---|---|
| (F) Soya bean flour | 300 |
| Calcium hydrate | 54 |
| Sodium carbonate | 30 |
| Sodium fluoride | 22½ |

These ingredients were thoroughly mixed in the dry state, then 640 parts of water were placed in a suitable mixing device, the above mixture of dry ingredients added and thoroughly stirred, then 452 parts of water were added and the whole stirred until free from lumps. The adhesive is now ready for use and may be designated as adhesive (F).

(G) Adhesive (G) was prepared exactly the same as adhesive (F) except that ten parts of furfural were added with the final water.

Adhesives (F) and (G) were spread on fir plywood, aged and tested dry, soaked in water for 48 hours and tested as described for preceding experiments with the following results:

|  | Dry tests | Tests after soaking 48 hours |
|---|---|---|
|  | Pounds per square inch | Pounds per square inch |
| Adhesive (F) | 215 | 115 |
| Adhesive (G) | 245 | 145 |

These tests show an increase of approximately fourteen per cent (14%) in dry strength and approximately twenty-seven per cent (27%) in wet adhesive strength as the direct result of the use of furfural.

Again for purposes of illustration I give below several formulæ which I have used in which one of the ingredients is furfural. The results obtained with adhesives made with these formulæ all show improvement over results obtained with similar formulæ from which the furfural was omitted.

| | | Parts |
|---|---|---:|
| (H) | Peanut flour | 180 |
| | Calcium hydrate | 28 |
| | Powdered rosin | 28 |
| | 18% Caustic soda solution | 30 |
| | 24% Sodium silicate solution | 90 |
| | Magnesium oxide | 40 |
| | Furfural | 10 |
| | Water | 900 |

(I) Same as (H) except using linseed flour.
(J) Same as (H) except using cottonseed flour.

| | | Parts |
|---|---|---:|
| (K) | Soya bean flour | 100 |
| | Calcium hydrate | 3 |
| | Caustic soda | 7 |
| | Furfural | 4 |
| | Water | 400 |

In further exemplification of the scope of my invention I may cite examples of the increased strength developed in adhesives adapted for sizing of cellulose fibre products such as paper, cotton or linen fabrics.

The term "size" is understood to include so-called engine size, surface size and also surface coating size, i. e., the adhesive (size) used to bind pigment to the surface of the paper in the manufacture of coated paper.

By "pigment" I mean any material, other than the adhesive embodying oleaginous seed flour, which material is bound to the cellulose fibre product including such materials as clay, kaolin, whiting, blanc fixe, and the like, asphalt, mineral and fatty oils and rosin.

A test which is used to evaluate the adhesive strength of a size when used in conjunction with a pigment in the manufacture of coated papers, for instance, is the so-called "sealing wax test." This test consists of determining the amount or proportion of fibre pulled from the paper when a piece of soft sealing wax is pressed against the surface, allowed to harden and then quickly removed. The test is made in comparison between a standard piece of coated paper and the sample to be tested.

It is of very material advantage to be able to give to each sample a numerical value. This is accomplished by preparing a series of standards by making "sealing wax tests" of coated paper containing varying amounts or proportions of adhesive or size so that the results range from very poor to practically perfect. For instance, a paper so poorly coated, or the coating of which contains so poor an adhesive that the coating is completely removed wherever touched by the sealing wax, without disturbance of the fibres of the cellulose fibre product, or paper, would be given a value of zero. On the other hand, a coating so perfect or containing an adhesive of such remarkable strength that the sealing wax when removed from the paper pulled with it not only the coating, but also the fibre and paper itself beneath the coating wherever same was touched by the sealing wax, would be given a value of 100. It is necessary, furthermore, in giving such numerical values to results obtained to carefully control all of the conditions under which the test is made. For instance, sealing wax having a constant melting point must be used, it must be heated to the same temperature before being applied to the paper in each instance, it must be applied to the paper with the same amount of pressure in each instance, allowed to remain for the same length of time and sharply removed in the same manner. Results given in these tests are the averages of large numbers of results obtained in order that personal errors may be so far as possible eliminated.

In illustration of a cellulose fibre product embodying an oleaginous seed flour adhesive we may coat paper with English coating clay and use soya bean flour, as representative oleaginous seed flour containing material, in the manufacture of the adhesive. The clay mix is made by mixing together 100 parts of English coating clay and 70 parts of water. This is allowed to stand at least 24 hours before using. The adhesive mix may be made by mixing together in a suitable mixing device 100 parts of soya bean flour, 500 parts of water, 6 parts of caustic soda and furfural in amount from 1 part to 20 parts. The mixture is further agitated and then heated on a water bath to 150° F. and then cooled. The clay mix and adhesive mix are then mixed in suitable proportions and are ready for application of the paper.

The test results given below are in exemplification of the material benefits to be derived as the result of my discovery using the same procedure as to methods of tests, formula for clay mix, adhesive mix, coating mix, etc., with the exception that the proportion of furfural added was varied as follows:

L–1 no furfural added to adhesive mix
L–2 furfural was added in the proportions of one part.
L–3 furfural was added in the proportions of ten parts.

Results:

| | Strength |
|---|---:|
| L–1 | 69 |
| L–2 | 92 |
| L–3 | 100 |

The remarkable increase in strength due to the embodiment of furfural is apparent.

It will be understood from the above that the adhesive or glue consists of ingredients, a part of which may be mixed together dry and form what is called the "dry-mix materials". These materials, thoroughly mixed together, may be commercially marketed and sold in sacks with directions to the user to add the furfural to the water which is added at the time of use of the adhesive or glue. Hence the adhesive dry-mix materials may be prepared and sold by an adhesive or glue manufacturer, while the furfural and water may be added separately by the user at a subsequent time, that is, at the time of using.

I claim:

1. The method of making adhesives which comprises adding furfural to oleaginous seed flour containing material dispensed in an alkaline medium.

2. The method of making adhesives which comprises adding furfural to oleaginous seed flour and casein containing material dispersed in an alkaline medium.

3. The method of making adhesives which comprises adding furfural to soya bean flour containing material dispersed in an alkaline medium.

4. The method of making adhesives which comprises adding furfural to soya bean flour and casein containing material dispersed in an alkaline medium.

5. In the manufacture of an adhesive embodying oleaginous seed flour dispersed in an alkaline medium the step of adding thereto furfural.

6. In the manufacture of an adhesive embodying oleaginous seed flour and casein dispersed in an alkaline medium the step of adding thereto furfural.

7. In the manufacture of an adhesive embodying soya bean flour dispersed in an alkaline medium the step of adding thereto furfural.

8. In the manufacture of an adhesive embodying soya bean flour and casein dispersed in an alkaline medium the step of adding thereto furfural.

9. An adhesive which embodies the reaction products of oleaginous seed flour containing material dispersed in an alkaline medium and furfural.

10. An adhesive which embodies the reaction products of oleaginous seed flour and casein containing material dispersed in an alkaline medium and furfural.

11. An adhesive which embodies the reaction products of soya bean flour containing material dispersed in an alkaline medium and furfural.

12. An adhesive which embodies the reaction products of soya bean flour and casein containing material dispersed in an alkaline medium and furfural.

In witness whereof, I hereunto subscribe my name this 18th day of January, 1929.

HARRY P. BANKS.